United States Patent
Ji et al.

(10) Patent No.: US 12,463,215 B2
(45) Date of Patent: Nov. 4, 2025

(54) METHOD AND SYSTEM FOR SULFUR AND SULFUR-CONTAINING CHEMICALS AS CATHODE ADDITIVES FOR SILICON ANODE-BASED LITHIUM ION BATTERIES

(71) Applicant: Enevate Corporation, Irvine, CA (US)

(72) Inventors: Liwen Ji, San diego, CA (US); Benjamin Park, Mission Viejo, CA (US); Jeremy Chang, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 534 days.

(21) Appl. No.: 16/706,234

(22) Filed: Dec. 6, 2019

(65) Prior Publication Data

US 2021/0175504 A1 Jun. 10, 2021

(51) Int. Cl.
*H01M 4/485* (2010.01)
*H01M 4/505* (2010.01)
*H01M 4/525* (2010.01)
*H01M 4/58* (2010.01)
*H01M 10/0525* (2010.01)
*H01M 10/0565* (2010.01)

(52) U.S. Cl.
CPC ......... *H01M 4/5815* (2013.01); *H01M 4/505* (2013.01); *H01M 4/525* (2013.01); *H01M 10/0525* (2013.01); *H01M 10/0565* (2013.01)

(58) Field of Classification Search
CPC ........ H01M 4/485; H01M 4/50; H01M 4/505; H01M 4/52; H01M 4/521; H01M 4/525; H01M 4/5815; H01M 10/0525; H01M 10/052
See application file for complete search history.

(56) References Cited

U.S. PATENT DOCUMENTS

| | | | | |
|---|---|---|---|---|
| 5,516,598 A * | 5/1996 | Visco | ............... | H01M 4/60 429/105 |
| 5,814,420 A | 9/1998 | Chu | | |
| 6,201,100 B1 * | 3/2001 | Gorkovenko | ........... | H01M 4/60 528/381 |
| 2009/0123839 A1 | 5/2009 | Soma et al. | | |
| 2010/0173198 A1 * | 7/2010 | Zhamu | .............. | H01M 4/38 429/231.95 |
| 2012/0282524 A1 | 11/2012 | Kono et al. | | |
| 2016/0133933 A1 | 5/2016 | Choi et al. | | |
| 2016/0141598 A1 | 5/2016 | Dai et al. | | |
| 2016/0322629 A1 * | 11/2016 | Gan | .................. | H01M 10/0525 |

FOREIGN PATENT DOCUMENTS

WO  WO-2019212905 A1 * 11/2019 .......... H01M 10/052

OTHER PUBLICATIONS

Long-chain solid organic polysulfide cathode for high-capacity secondary lithium batteries, Zeng et al, Energy Storage Materials 12 (2018) 30-36.*
Synthesis of Transition Metal Polysulfide Complexes From Metal Powders, Emannuel Ramli, Final Seminar, Sep. 25, 1990.*
Notification of Transmittal of The International Search Report and the Written Opinion of the International Searching Authority, or the Declaration for International Application No. PCT/US20/63019, International Filing Date Dec. 3, 2020, Applicant: Enevate Corporation.
Zhang et al, 'Elemental Sulfur as a Cathode Additive for Enhanced Rate Capability of Layered Lithium Transition Metal Oxides', Journal of the Electrochemical Society, vol. 166, issue 4, Feb. 9, 2019 (Feb. 9, 2019), p. A487-A492.
International Preliminary Report on Patentability, PCT/US2020/063019 dated Jun. 16, 2022, 8 pages.

* cited by examiner

*Primary Examiner* — Haidung D Nguyen
(74) *Attorney, Agent, or Firm* — McAndrews, Held & Malloy, Ltd.

(57) ABSTRACT

Systems and methods for sulfur-containing chemicals as cathode additives for silicon-based lithium ion batteries may include a silicon-based anode, an electrolyte, and a cathode. The cathode may include an active material and a sulfur-containing additive. The cathode active material may include one or more of nickel cobalt aluminum oxide (NCA), nickel cobalt manganese oxide (NCM), lithium iron phosphate (LFP), lithium cobalt oxide (LCO), and lithium manganese oxide (LMO). The sulfur-containing additive may include elemental sulfur and/or $Li_2S$. The sulfur-containing additive may include one or more of lithium polysulfides ($Li_2S_n$, where n=2-8), polysulfides, and organic polysulfides. The sulfur-containing additive may include one or more of metal sulfides, transition metal polysulfide complexes, S-containing organic polymers or copolymer, polymeric sulfur, and transition metal sulfides. The sulfur-containing additive may include 5% or less by weight of the active material, or 1% or less by weight of the active material.

8 Claims, 9 Drawing Sheets

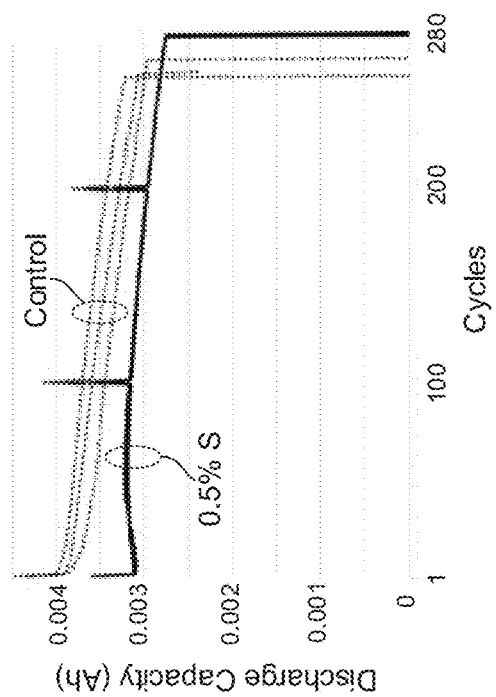
FIG. 6A
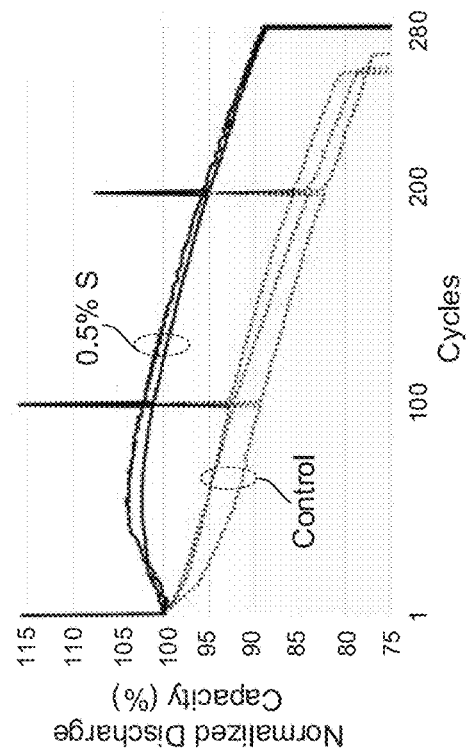
FIG. 6B
FIG. 6A-6B

METHOD AND SYSTEM FOR SULFUR AND SULFUR-CONTAINING CHEMICALS AS CATHODE ADDITIVES FOR SILICON ANODE-BASED LITHIUM ION BATTERIES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for sulfur-containing chemicals as cathode additives for silicon-based lithium ion batteries.

BACKGROUND

Conventional approaches for battery cathodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for sulfur-containing chemicals as cathode additives for silicon-based lithium ion batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 6A and 6B illustrate capacity retention plots for Si-dominant anode//NCM cathode coin cells with control and 0.5% sulfur additive-containing cathodes, in accordance with an example embodiment of the disclosure.

DETAILED DESCRIPTION OF THE INVENTION

Figure 1:
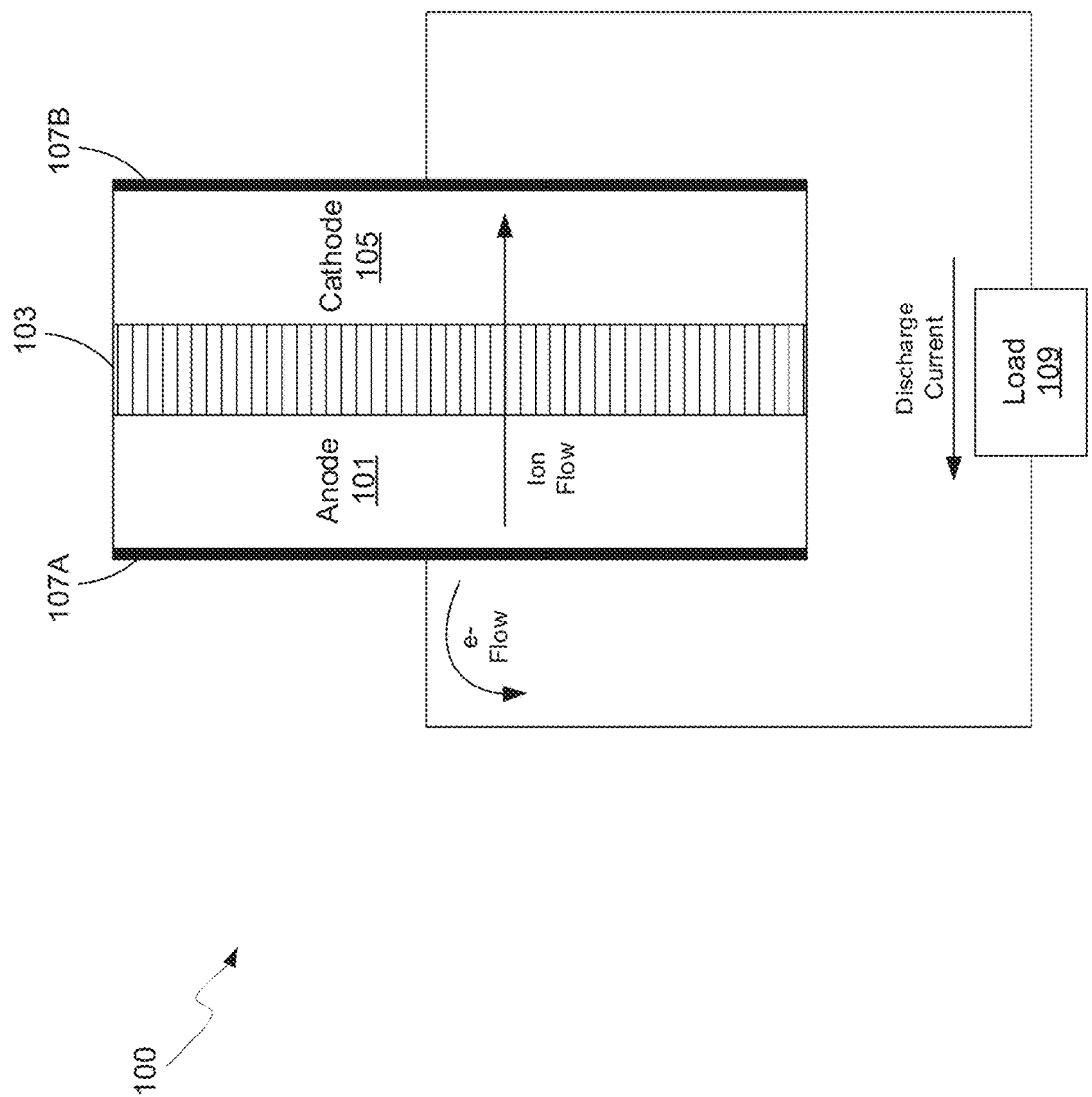
FIG. 1 is a diagram of a battery, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), di-fluoroethylene carbonate (DiFEC), trifluoropropylene carbonate (TFPC), vinyl carbonate (VC), Propylene Carbonate (PC), Dimethyl Carbonate (DMC), Ethyl Methyl Carbonate (EMC), Diethyl Carbonate (DEC), etc. with dissolved lithium hexafluorophosphate ($LiPF_6$), lithium tetrafluoroborate ($LiBF_4$), lithium hexafluoroarsenate monohydrate ($LiAsF_6$), lithium perchlorate ($LiClO_4$), lithium bis(trifluoromethanesulfonyl) imide (LiTFSI), lithium bis(fluorosulfonyl)imide (LiFSI), lithium difluoro(oxalate)borate (LiDFOB), lithium bis(oxalato)borate (LiBOB), and lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB) and lithium 2-fluorophenol trimethyl borate (LFPTB), lithium catechol dimethyl borate (LiCDMB), etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g at high temperature and 3579 mAh/g at room temperature. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), graphite, graphene, etc. and/or a mixture of these have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Among all the potential cathode active materials, Ni-rich NCA (Nickel cobalt aluminum oxide) and NCM (Nickel Cobalt Manganese Oxide) are considered to be most promising. Ni-rich NCA or NCM cathodes show excellent thermodynamic stability and specific capacity as high as 200 mAh/g. Although NCA or NCM are best known for long-term stability and high energy density, they have also been shown to be problematic due to poor cycle stability and low electronic conductivity.

It is generally believed that the capacity of the cathode materials is one of the major limiting factors for the energy density of Li-ion batteries. Therefore, Ni-rich cathode materials (such as NCA, NCM) and Li-rich layered oxide cathode materials have been considered and explored as the possible future choices because of their high specific capacity and low cost. These materials are especially useful if they can be coupled with high capacity and low-voltage anode materials, such as Si. However, these cathode materials have some fundamental challenges, such as irreversible phase transition from hexagonal through cubic to rock salt structure, mechanical crack of the secondary particle structure, electrolyte depletion that is often accompanied by impedance increase and volumetric swelling of the batteries, as well as gelation of cathode slurry in the slurry-making process.

From the cathode side, a number of strategies may be utilized to overcome these issues, such as cation doping for stabilizing the cathode material lattice structure, surface coating for protecting cathode particles from parasitic reactions with the electrolyte components, synthesizing concentration-gradient or core-shell structures with high Ni content core for stabilizing the material's surface chemistry, as well as using electrolyte additives for chemically trapping the released oxygen.

Without negative impacts on the anode, electrolyte, and the battery manufacturing procedures or design, adding a cathode additive is considered to be another efficient, cost-effective and practically feasible strategy to overcome the barriers of layered cathode materials and to improve the full cell performance.

Elemental sulfur, $Li_2S$, lithium polysulfides ($Li_2S_n$, where n=2-8), other polysulfides, organic polysulfides, transition metal polysulfide complexes, S-containing organic polymers or copolymer, polymeric sulfur, or S-rich organic chemicals, different types of transition metal sulfides, or other high sulfur-content materials, etc. may be used as cathode additives for different types of cathode-based (such as Ni-rich NCA or NCM, Li-rich, $xLi_2MnO_3·(1-x)LiNi_aCo_bMn_cO_2$, Li-rich layered oxides, high-voltage spinel oxides, etc.) in Li-ion full cells with anodes containing Si. These materials may be incorporated as additives in the cathode active material slurry, by directly adding them into the electrolyte solution, and/or by dipping the prepared cathodes into solutions with these materials. Therefore, the sulfur additives may be incorporated within the cathodes or on the surface of the cathodes. This may help improve structural stability and enhance the ionic conductivity of the cathode materials due to their weaker interaction between Li and S. In addition, the transition metal ions in the Ni-rich (NCA or NCM) Li-rich or other cathodes can afford abundant polar active sites for the absorption of element S or the S portion in the above-mentioned sulfur-containing additives. This may suppress the dissolution of Mn cation or other transition metal ions into an electrolyte solution. The synergistic effect may be helpful to further improve the cycle performance and energy density of high-capacity, high-voltage cathode based Li-ion full cells with Si anodes. At the same time, these materials may also interact with the Si anode and contribute to the SEI composition and formation. Sulfur-containing additive may form electronically conductive interphase films, and be beneficial to the ionic conductivity of the interphase.

Figure 2:
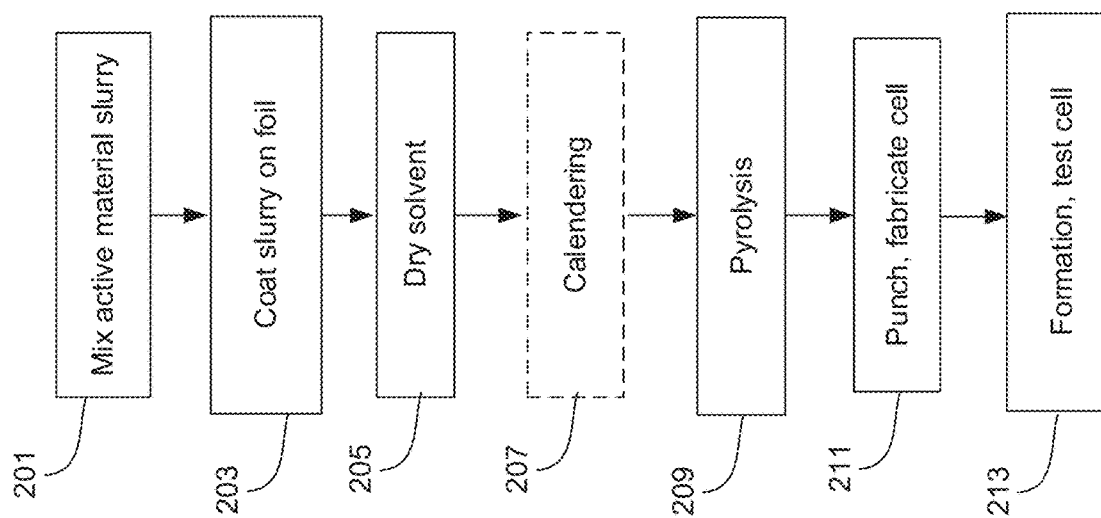
FIG. 2 is a flow diagram of a direct coating process for forming a cell with sulfur additive cathode, in accordance with an example embodiment of the disclosure.

FIG. 2 is a flow diagram of a direct coating process for forming a cell with sulfur additive cathode, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as PVDF, CMC, SBR, Sodium Alginate, PAI, Poly(acrylic acid) (PAA), PI, LA133, polyvinyl alcohol (PVA), polyethylene glycol (PEG), Nafion solution, recently reported electronically conductive polymer binders, and mixtures and combinations thereof. Another example process comprising forming the active material on a substrate and then transferring to the current collector is described with respect to FIG. 3.

In step 201, the raw electrode active material may be mixed using a binder/resin (such as PI, PAI), solvent, and conductive carbon. For example, for the cathode, Super P/VGCF (1:1 by weight), or other types carbon materials, such as graphite, graphene, etc., may be dispersed in binder solution (mixture of NMP and PVDF) for 0.5 to 2 minutes at 1500-2500 rpm. NCA cathode material powder may be added to the mixture along with NMP solvent, then dispersed for another 1-3 minutes at 1500-2500 rpm to achieve a slurry viscosity within 2000-4000 cP (total solid content of about 48%). A sulfur-based additive may be mixed in with the slurry at this point, or may be added at a later stage in the process. A similar process may be utilized to mix the active material slurry for the anode.

In step 203, the cathode slurry may be coated on an aluminum foil at a loading of, e.g., 15-35 $mg/cm^2$. Similarly, the anode slurry may be coated on a copper foil at a loading of 3-6 $mg/cm^2$, which may undergo drying in step 205 resulting in less than 13-20% residual solvent content. In another example scenario, a sulfur-based additive may be incorporated by dipping the coated foil in a solution with the desired additive.

In step 207, an optional calendering process may be utilized where a series of hard pressure rollers may be used to finish the film/substrate into a smoother and denser sheet of material.

In step 209, the active material may be pyrolyzed by heating to 500-1200 C such that carbon precursors are partially or completely converted into glassy carbon. Pyrolysis can be done either in roll form or after punching in step 211. If done in roll form, the punching is done after the pyrolysis process. The punched electrode may then be sandwiched with a separator and cathode with electrolyte to form a cell. If the sulfur-based additives has not been incorporated up to this point, it may be added after pyrolysis in the cell fabrication process as an electrolyte additive, for example. In step 213, the cell may be subjected to a formation process, comprising initial charge and discharge steps to lithiate the anode, with some residual lithium remaining and cell testing to determine performance.

Figure 3:
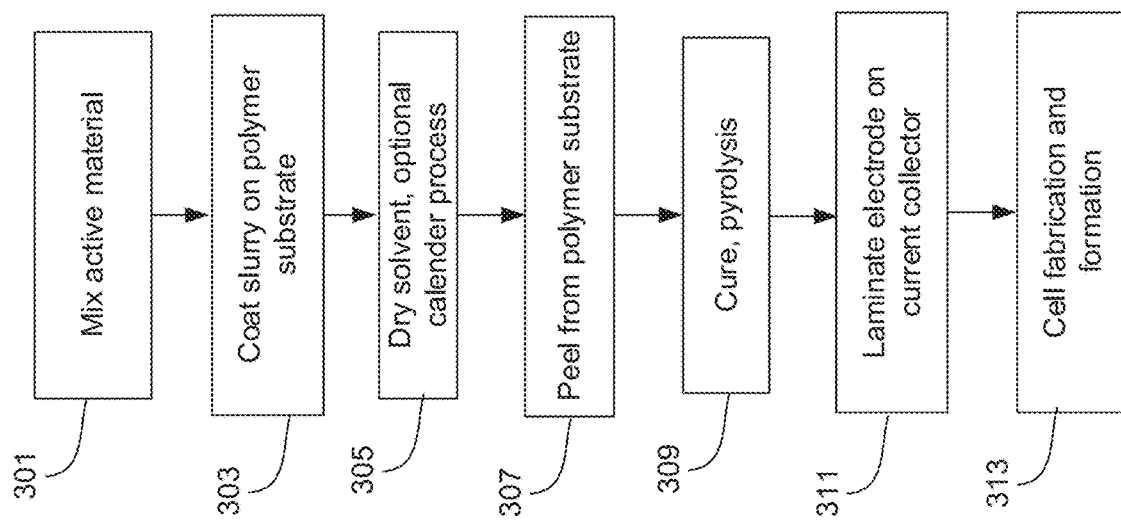
FIG. 3 is a flow diagram of an alternative process for lamination of electrodes, in accordance with an example embodiment of the disclosure.

FIG. 3 is a flow diagram of an alternative process for lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 3, starting with step 301 where the raw electrode active material may be mixed using a binder/resin (such as PI, PAI), solvent, and conductive carbon. For example, for the cathode, Super P/VGCF (1:1 by weight) may be dispersed in binder solution (mixture of NMP and PVDF) for 0.5 to 2 minutes at 1500-2500 rpm. NCM, NCA, Li-rich or other cathode material powder may be added to the mixture along with NMP solvent, then dispersed for another 1-3 minutes at 1500-2500 rpm to achieve a slurry viscosity within 2000-4000 cP (total solid content of about 48%). A sulfur-based additive may be mixed in with the slurry at this point, or may be added at a later stage in the process. A similar process may be utilized to mix the active material slurry for the anode.

In step 303, the slurry may be coated on a polymer substrate, such as polyethylene terephthalate (PET), polypropylene (PP), or Mylar. The slurry may be coated on the PET/PP/Mylar film at a loading of 3-6 mg/cm$^2$ (with 13-20% solvent content) for the anode and 15-35 mg/cm$^2$ for the cathode, and then dried to remove a portion of the solvent in step 305. In another example scenario, a sulfur-based additive may be incorporated by dipping the green layer coated substrate in a solution with the desired additive. An optional calendering process may be utilized where a series of hard pressure rollers may be used to finish the film/substrate into a smoothed and denser sheet of material.

In step 307, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 309 where the film may be cut into sheets, and vacuum dried using a two-stage process (100-140° C. for 14-16 hours, 200-240° C. for 4-6 hours). The dry film may be thermally treated at 1000-1300° C. to convert the polymer matrix into carbon.

In step 311, the pyrolyzed material may be flat press or roll press laminated on the current collector, where for aluminum foil for the cathode and copper foil for the anode may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector. In yet another example scenario, a sulfur-based additive may be incorporated by dipping the coated foil in a solution with the desired additive.

In step 313, the electrodes may then be sandwiched with a separator and electrolyte to form a cell. If the sulfur-based additives has not been incorporated up to this point, it may be added after pyrolysis in the cell fabrication process as an electrolyte additive, for example. The cell may be subjected to a formation process, comprising initial charge and discharge steps to lithiate the anode, with some residual lithium remaining, and testing to assess cell performance.

Figure 4:
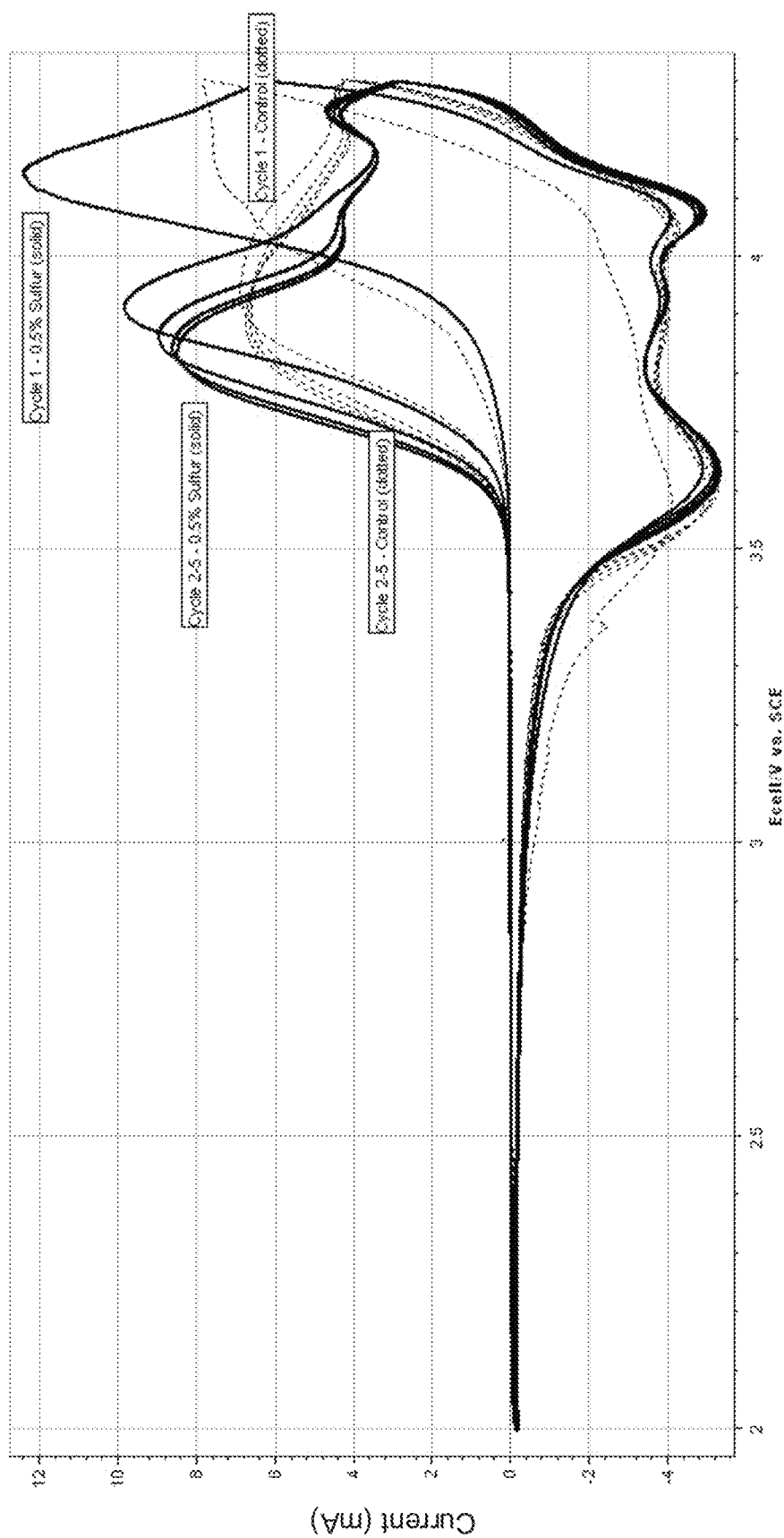
FIG. 4 illustrates cyclic voltammetry curves of different NCM cathode-based coin half cells, in accordance with an example embodiment of the disclosure.

FIG. 4 illustrates cyclic voltammetry curves of different NCM cathode-based coin half cells, in accordance with an example embodiment of the disclosure. Referring to FIG. 4, there is shown cyclic voltammetry curves with dotted lines for control cathodes, without sulfur additive, and solid lines for cathodes with 0.5% sulfur additive, both using NCM. The plot shows potentials of the anode and cathode with respect to a saturated calomel electrode at different cell current in milliamps. The electrolyte formulation may comprise 1.2 M LiPF$_6$ in FEC/EMC (3/7 wt %). In this example, the Si-dominant anodes may comprise ~80 wt % Si, 5 wt % graphite and 15 wt % glassy carbon from the pyrolyzed resin and may be laminated on 15 μm Cu foil. The average loading may be 3.5-4.5 mg/cm$^2$. The control cathodes may comprise about 92 wt % NCM, 4 wt % Super P and 4 wt % PVDF, and may be coated on 15 μm Al foil. The average loading is about 15-25 mg/cm$^2$. The 0.5 wt % S-containing NCM cathodes may comprise about 92 wt % NCM, 0.5 wt % elemental S, 4 wt % Super P and 4 wt % PVDF, and also coated on 15 μm Al foil with a similar loading as the control cathodes. The CV measurements may be carried out in the voltage range of 2-4.3 V at a scan rate of 0.2 mV s$^{-1}$, for example.

FIG. 4 illustrates that 0.5 wt % sulfur additive in the cathodes may reduce the polarization of the charging and discharging processes of Si-dominant anode//NCM cathode full cells, which may lead to reduced interfacial impedance and enhanced cycling performance.

Figure 5:
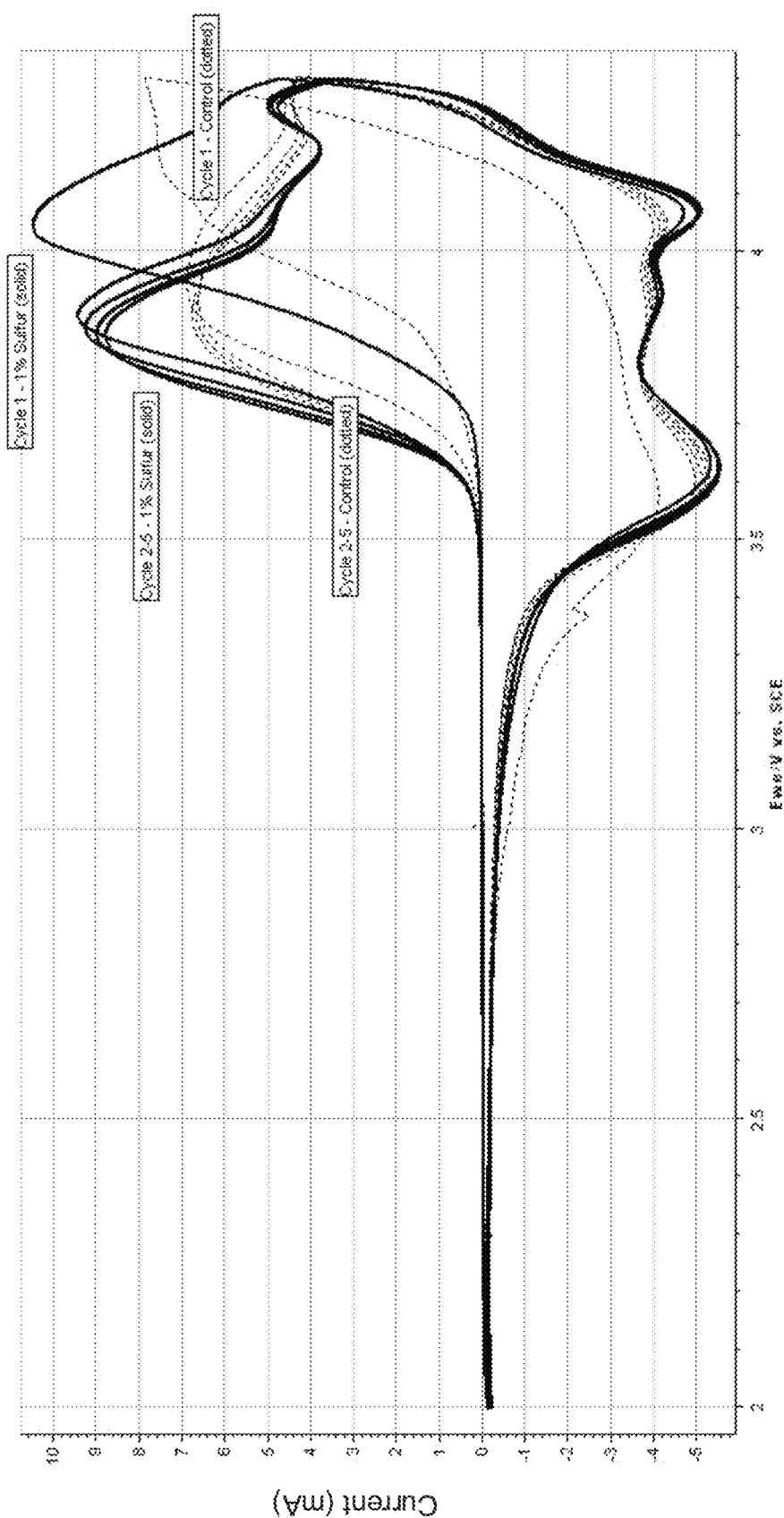
FIG. 5 illustrates cyclic voltammetry curves of different NCM cathode-based coin half cells, in accordance with an example embodiment of the disclosure.

FIG. 5 illustrates cyclic voltammetry curves of different NCM cathode-based coin half cells, in accordance with an example embodiment of the disclosure. Referring to FIG. 5, there is shown cyclic voltammetry curves with dotted lines for control anodes without sulfur additive, and solid lines for cathodes with 1.0% sulfur additive, both types of cathode comprising NCM. The electrolyte formulation may comprise 1.2 M LiPF$_6$ in FEC/EMC (3/7 wt %). The Si-dominant anodes may comprise about 80 wt % Si, 5 wt % graphite, and 15 wt % glassy carbon from pyrolyzed resin, and may be laminated on 15 μm Cu foil. The average loading may be 3.5-4.5 mg/cm$^2$. The control cathodes contain about 92 wt % NCM811, 4 wt % Super P and 4 wt % PVDF5130, and may be coated on 15 μm Al foil. The average loading may be 15-25 mg/cm$^2$. The 1 wt % S-containing NCM cathodes comprise ~91 wt % NCM811, 1 wt % elemental S, 4 wt % Super P and 4 wt % PVDF, and may be coated on 15 μm Al foil with a similar loading. The CV measurements may be performed in the voltage range of 2-4.3 V at a scan rate of 0.2 mV s$^{-1}$.

The plot in FIG. 5 indicates that 1 wt % sulfur additive may reduce the polarization of the charging and discharging processes of Si-dominant anode//NCM cathode full cells. This may lead to reduced interfacial impedance and enhanced cycling performance.

FIGS. 6A and 6B illustrate capacity retention plots for Si-dominant anode//NCM cathode coin cells with control and 0.5% sulfur additive-containing cathodes, in accordance with an example embodiment of the disclosure. FIG. 6A shows discharge capacity retention and FIG. 6B shows normalized discharge capacity retention of Si-dominant anode//NCM cathode coin full cells. The NCM control cathode is represented by the dotted lines and the 0.5 wt % S-containing NCM cathode is represented by the solid lines. The Si-dominant anodes may contain about 80 wt % Si, 5 wt % graphite, and 15 wt % glassy carbon from pyrolyzed resin and may be laminated on 15 μm Cu foil. The average loading may be 3.5-4.5 mg/cm$^2$. The control cathodes may comprise ~92 wt % NCM, 4 wt % Super P and 4 wt % PVDF, and may be coated on 15 μm Al foil. The average loading may be 20-25 mg/cm$^2$. The 0.5 wt % S-containing NCM cathodes may comprise 91.5 wt % NCM, 1 wt % elemental S, 4 wt % Super P and 4 wt % PVDF, and may also be coated on 15 μm Al foil with a slightly lower loading than the control. The cells may be tested at a nominal 25° C.

In an example scenario, the long-term cycling programs comprise: (i) At the 1$^{st}$ cycle, charge at 0.33 C to 4.2 V until 0.05 C, rest 5 minutes, discharge at 0.33 C to 3.1 V, rest 5 minutes; and (ii) from the 2$^{nd}$ cycle, charge at 1 C to 4.2 V until 0.05 C, rest 5 minutes, discharge at 0.5 C to 3.1 V, rest 5 minutes. After every 100 cycles, the test conditions in the 1$^{st}$ cycle may be repeated, which corresponds to the spikes in the curves every 100 cycles.

The plots indicate that the 0.5 wt % S-containing NCM cathode-based coin full cells have better cycle performance than the control cells, dropping to ~90% normalized capacity after ~280 cycles as compared to ~75-80% for the control cathode cells.

Figure 7A:
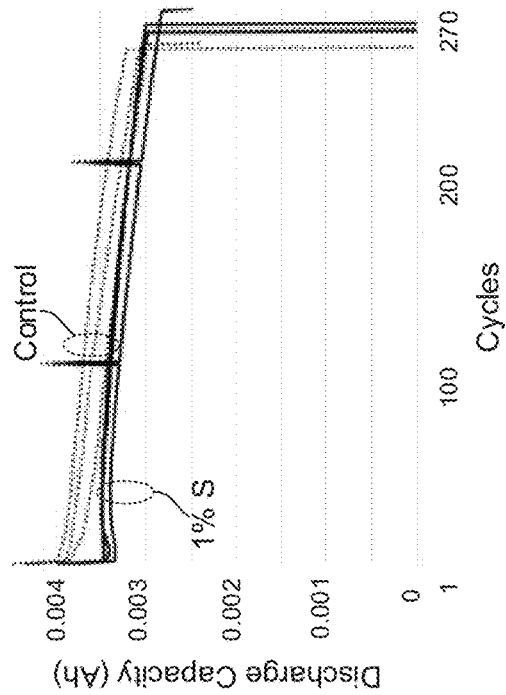
FIGS. 7A and 7B illustrate capacity retention plots for Si-dominant anode//NCM cathode coin cells with control and 1% sulfur additive-containing additive cathodes, in accordance with an example embodiment of the disclosure.
Figure 7B:
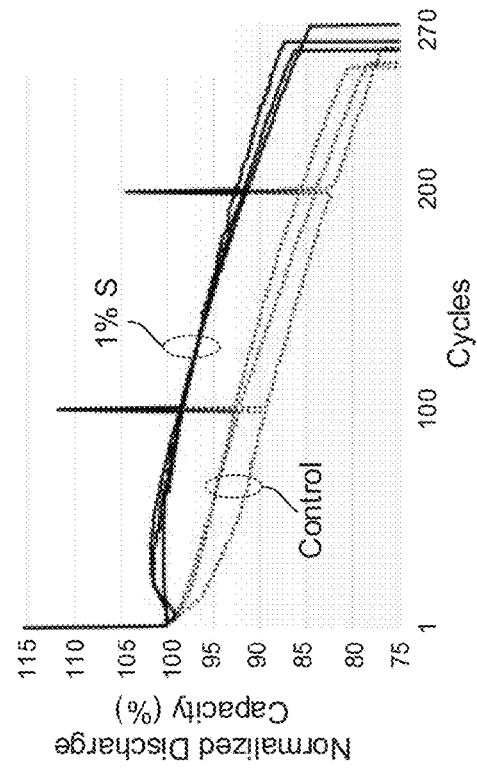

FIGS. 7A and 7B illustrate capacity retention plots for Si-dominant anode//NCM cathode coin cells with control and 1% sulfur additive-containing additive cathodes, in accordance with an example embodiment of the disclosure. FIG. 6A shows discharge capacity retention and FIG. 6B shows normalized discharge capacity retention of Si-dominant anode//NCM cathode coin full cells. The NCM control cathode is represented by the dotted lines and the 1.0 wt % S-containing NCM cathode is represented by the solid lines.

The Si-dominant anodes comprise ~80 wt % Si, 5 wt % graphite, and 15 wt % glassy carbon from pyrolyzed resin and may be laminated on 15 μm Cu foil. The average loading may be 3.5-4.5 mg/cm$^2$. The control cathodes comprise ~92 wt % NCM, 4 wt % Super P, and 4 wt % PVDF, and may be coated on 15 μm Al foil. The average loading may be 20-25 mg/cm$^2$. The 1.0 wt % S-containing NCM cathodes may comprise ~91 wt % NCM, 1 wt % elemental S, 4 wt % Super P and 4 wt % PVDF5130, and may also be coated on 15 μm Al foil with a slightly lower loading than the control. The cells may be tested at a nominal 25° C.

The plots indicate that the 1 wt % S-containing NCM cathode-based coin full cells have better cycle performance than the control, dropping to 85-95% normalized capacity after ~270 cycles as compared to ~75-80% for the control cathode cells.

Figure 8A:
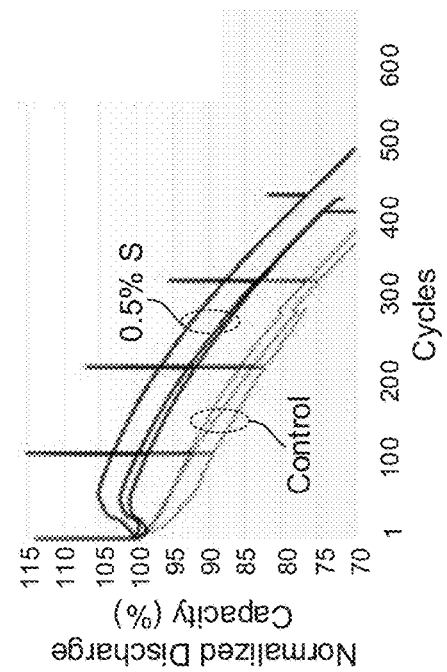
FIGS. 8A and 8B illustrate capacity retention plots for different Si-dominant anode//NCM cathode coin cells with control and 0.5% sulfur additive-containing cathodes, in accordance with an example embodiment of the disclosure.
Figure 8B:
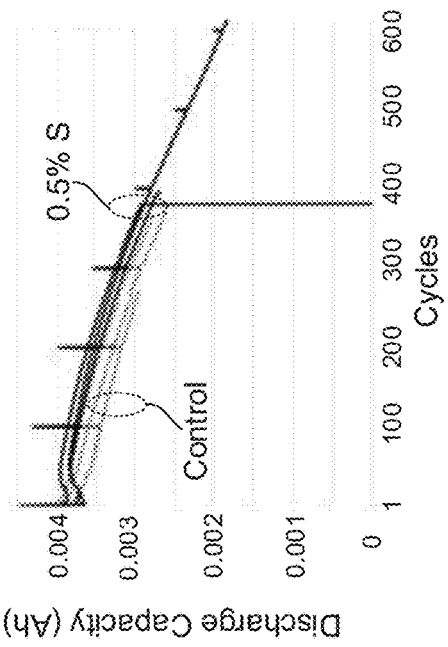

FIGS. 8A and 8B illustrate capacity retention plots for different Si-dominant anode//NCM cathode coin cells with control and 0.5% sulfur additive-containing cathodes, in accordance with an example embodiment of the disclosure. FIG. 8A shows discharge capacity retention and FIG. 8B shows normalized discharge capacity retention of Si-dominant anode//NCM cathode coin full cells. The NCM control cathode is represented by the dotted lines and the 0.5 wt % S-containing NCM cathode is represented by the solid lines.

The Si-dominant anodes comprise ~80 wt % Si, 5 wt % graphite and 15 wt % glassy carbon pyrolyzed from resin, and may be laminated on 15 μm Cu foil. The average loading may be 3.5-4.5 mg/cm$^2$. The control cathodes contain about 92 wt % NCM, 4 wt % Super P and 4 wt % PVDF, and may be coated on 15 μm Al foil. The average loading may be 15-25 mg/cm$^2$. The 0.5 wt % S-containing NCM cathodes comprise ~91.5 wt % NCM, 1 wt % elemental S, 4 wt % Super P and 4 wt % PVDF, and may also be coated on 15 μm Al foil with a similar loading as the control. The cells may be tested at a nominal 25° C.

The plots indicate that the 0.5 wt % S-containing NCM cathode-based coin full cells have better cycle performance than the control cells, dropping to ~70-75% normalized capacity after 450-500 cycles as compared to ~75% after ~350-375 cycles for the control cathode cells.

Figure 9A:
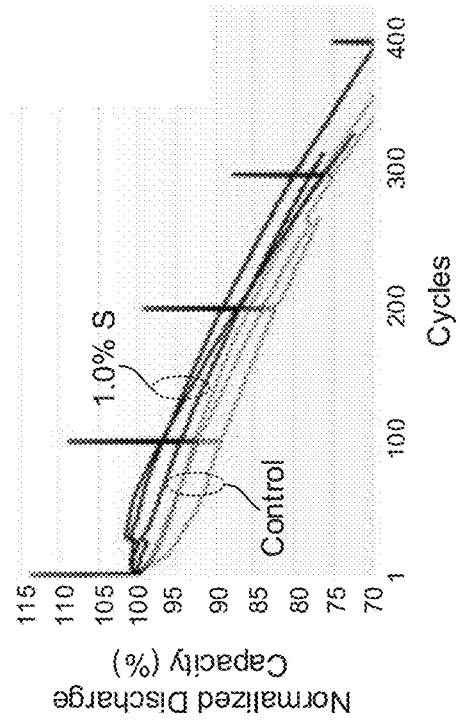
FIGS. 9A and 9B illustrate capacity retention plots for different Si-dominant anode//NCM cathode coin cells with control and 1.0% sulfur additive-containing cathodes, in accordance with an example embodiment of the disclosure.
Figure 9B:
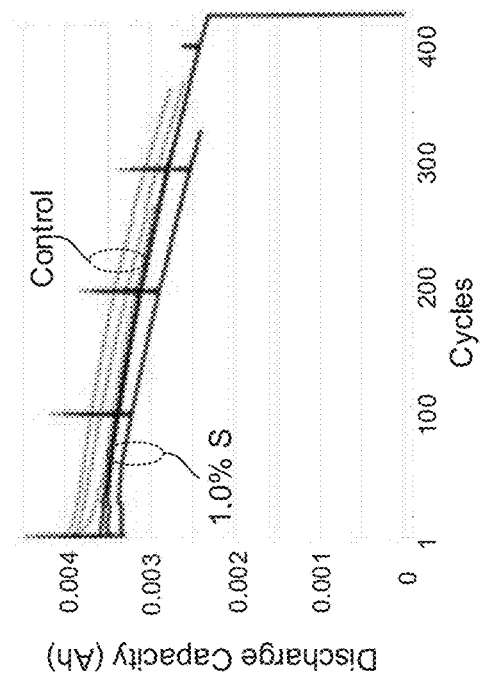

FIGS. 9A and 9B illustrate capacity retention plots for different Si-dominant anode//NCM cathode coin cells with control and 1.0% sulfur additive-containing cathodes, in accordance with an example embodiment of the disclosure. FIG. 8A shows discharge capacity retention and FIG. 8B shows normalized discharge capacity retention of Si-dominant anode//NCM cathode coin full cells. The NCM control cathode is represented by the dotted lines and the 1.0 wt % S-containing NCM cathode is represented by the solid lines.

The Si-dominant anodes may comprise ~80 wt % Si, 5 wt % graphite and 15 wt % glassy carbon (from resin) and are laminated on 15 μm Cu foil. The average loading is about 3.5-4.5 mg/cm$^2$. The control cathodes comprise ~92 wt % NCM, 4 wt % Super P and 4 wt % PVDF, and may be coated on 15 μm Al foil. The average loading may be 15-25 mg/cm$^2$. The 1.0 wt % S-containing NCM cathodes comprise ~91 wt % NCM, 1 wt % elemental S, 4 wt % Super P and 4 wt % PVDF, and also may be coated on 15 μm Al foil with a similar loading as the control. The cells may be tested at a nominal 25° C.

The plots indicate that the 1.0 wt % S-containing NCM cathode-based coin full cells have better cycle performance than the control cells, dropping to ~70-75% normalized capacity after ~400 cycles as compared to ~70% after ~350 cycles for the control cathode cells.

In an example scenario, sulfur may be used as a cathode additive to improve cycle performance of Li[Ni$_x$Co$_y$Al$_{1-x-y}$]O$_2$ (NCA) or Li[Ni$_x$Co$_y$Mn$_{1-x-y}$]O$_2$ (NCM) (including NCM811, NCM622, NCM532, NCM442, NCM111, and others) cathode-based Li-ion full cells with all other types of Si anodes. Furthermore, sulfur may be used as a cathode additive to improve cycle performance for LCO and/or LMO cathode-based full cells with different Si anodes. Sulfur may also be utilized as a cathode additive to improve cycle performance for Li-rich, xLi$_2$MnO$_3$·(1-x)LiNi$_a$Co$_b$Mn$_c$O$_2$ cathode-based full cells with different Si anodes, as well as for a cathode additive to improve cycle performance for Ni-rich layered oxides (LiNi$_{1-x}$M$_x$O$_2$, where M=Co, Mn, and Al)-based Li-ion full cells with different Si anodes. In another example, sulfur may be used as a cathode additive to improve cycle performance for Li-rich layered oxides (LiNi$_{1+x}$M$_{1-x}$O$_2$, where M=Co, Mn, and Ni)-based Li-ion full cells with different Si anodes. In yet another example, sulfur may be used as a cathode additive to improve cycle performance for high-voltage spinel oxides (LiNi$_{0.5}$Mn$_{1.5}$O$_4$) cathode Li-ion full cells with different Si anodes.

Sulfur may also be used as a cathode additive to improve cycle performance for high-voltage polyanionic compounds (phosphates, sulfates, silicates, etc.) cathode-based Li-ion full cells with different anodes. The elemental sulfur for the above examples may be replaced with Li$_2$S, lithium polysulfides, (Li$_2$S$_n$, where n=2-8), or other polysulfides. Transition metal polysulfide complexes such as (C$_5$H$_5$)$_2$TiS$_5$, [Ni(S$_4$)$_2$]$^{2-}$, and [Pt(S$_5$)$_3$]$^{2-}$, may be utilized as a cathode additive to improve cycle performance of all of the aforementioned cathode-based Li-ion full cells with different Si anodes.

In another example embodiment, sulfur-based polymers or copolymers comprising strings of sulfur atoms tangled up with the other groups may be utilized as a cathode additive to improve cycle performance of all of the aforementioned cathode-based Li-ion full cells with different Si anodes. In yet another example embodiment, polymeric sulfur or organic ploysulfides may be utilized as a cathode additive to improve cycle performance of all of the aforementioned cathode-based Li-ion full cells with different Si anodes. Organic polysulfides refers to a class of polymers with alternating chains of several sulfur atoms and hydrocarbons.

In another example scenario, metal sulfides (Fe, Co, Ni, Mo, Cr, W, Ti, Zn, Bi, Cu, V, Zr, Sn, and Mn, etc.) or other high sulfur-content materials may be utilized as a cathode additive to improve cycle performance of all of the aforementioned cathode-based Li-ion full cells with different Si anodes. Each of the aforementioned materials may be incorporated in a cathode active material slurry, or deposited on a cathode active material after being formed on a substrate or foil, by dipping in a second slurry or depositing with other layer deposition techniques. The sulfur-containing additive may comprise 5% or less of the cathode active material. In another example, the sulfur-containing additive may comprise 2% or less of the cathode active material. In yet another example, the sulfur-containing additive may comprise 1% or less of the cathode active material.

A sulfur-containing additive-based solution may be utilized to directly coat or incorporate sulfur into cathode active material. The solvent in the solution may comprise $CS_2$, cyclohexane, toluene or other similar solvents.

The anodes used with the sulfur-additive cathodes disclosed here may comprise >50% silicon in the active material and heat-treated to above 300 degrees Celsius. In another example scenario, the anodes may comprise >25% silicon in the active material and heat-treated to above 300 degrees Celsius. In yet another example scenario, the anodes may comprise >50% silicon in the active material and heat-treated to above 400 degrees Celsius.

In an example embodiment of the disclosure, a method and system are described for sulfur-containing chemicals as cathode additives for silicon-based lithium ion batteries. The battery may comprise a silicon-based anode, an electrolyte, and a cathode. The cathode may comprise an active material and a sulfur-containing additive. The cathode active material may comprise one or more of nickel cobalt aluminum oxide (NCA), nickel cobalt manganese oxide (NCM), lithium iron phosphate (LFP), lithium cobalt oxide (LCO), and lithium manganese oxide (LMO), Ni-rich layered oxides ($LiNi_{1-x}M_xO_2$, where M=Co, Mn, or Al), Li-rich $xLi_2MnO_3 \cdot (1-x)LiNi_aCo_bMn_cO_2$, Li-rich layered oxides ($LiNi_{1+x}M_{1-x}O_2$, where M=Co, Mn, or Ni), high-voltage spinel oxides ($LiNi_{0.5}Mn_{1.5}O_4$), etc.

The sulfur-containing additive may comprise elemental sulfur and/or $Li_2S$. The sulfur-containing additive may comprise one or more of lithium polysulfides ($Li_2S_n$, where n=2-8), polysulfides, and organic polysulfides. The sulfur-containing additive may comprise one or more of metal sulfides, transition metal polysulfide complexes, S-containing organic polymers or copolymer, polymeric sulfur, and transition metal sulfides. The sulfur-containing additive may comprise 5% or less by weight of the active material, or 1% or less by weight of the active material. The anode may comprise an active material that comprises between 50% to 95% silicon. The battery may comprise a lithium ion battery. The electrolyte may comprise a liquid, solid, or gel As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
 a silicon-based anode, an electrolyte, and a cathode, wherein the cathode comprises an active material and a sulfur-containing additive;
 wherein said sulfur-containing additive is a transition metal polysulfide complex and wherein said transition metal polysulfide complex is $(C_5H_5)_2TiS_5$, $[Ni(S_4)_2]^{2-}$, or $[Pt(S_5)_3]^{2-}$;
 wherein the sulfur-containing additive comprises 5% or less by weight of the active material;
 wherein the cathode active material comprises one or more of: nickel cobalt aluminum oxide (NCA), nickel cobalt manganese oxide (NCM), lithium cobalt oxide (LCO), lithium manganese oxide (LMO), Ni-rich layered oxides, Li-rich layered oxides, and spinel oxides $LiNi_{0.5}Mn_{1.5}O_4$; and
 wherein the anode comprises an active material that comprises between 50% to 95% silicon by weight.

2. The battery according to claim 1, wherein the sulfur-containing additive comprises 1% or less by weight of the active material.

3. The battery according to claim 1, wherein the battery comprises a lithium ion battery.

4. The battery according to claim 1, wherein the electrolyte comprises a liquid, solid, or gel.

5. A method of forming a battery, the method comprising:
 forming a battery comprising a silicon-based anode, an electrolyte, and a cathode, wherein the cathode comprises an active material and a sulfur-containing additive;
 wherein said sulfur-containing additive is a transition metal polysulfide complex and wherein said transition metal polysulfide complex is $(C_5H_5)_2TiS_5$, $[Ni(S_4)_2]^{2-}$, or $[Pt(S_5)_3]^{2-}$;
 wherein the sulfur-containing additive comprises 5% or less by weight of the active material;
 wherein the cathode active material comprises one or more of: nickel cobalt aluminum oxide (NCA), nickel cobalt manganese oxide (NCM), lithium cobalt oxide (LCO), lithium manganese oxide (LMO), Ni-rich layered oxides, Li-rich layered oxides, and spinel oxides $LiNi_{0.5}Mn_{1.5}O_4$; and
 wherein the anode comprises an active material that comprises between 50% to 95% silicon by weight.

6. The method according to claim 5, wherein the sulfur-containing additive comprises 1% or less by weight of the active material.

7. The method according to claim 5, wherein the battery comprises a lithium ion battery and the electrolyte comprises a liquid, solid, or gel.

8. A battery, the battery comprising:
a battery comprising a silicon-dominant anode, an electrolyte, and a cathode, wherein the cathode comprises an active material and a sulfur-containing additive;
wherein said sulfur-containing additive is a transition metal polysulfide complex and wherein said transition metal polysulfide complex is $(C_5H_5)_2TiS_5$, $[Ni(S_4)_2]^{2-}$, or $[Pt(S_5)_3]^{2-}$;
and wherein the sulfur-containing additive comprises 5% or less by weight of the active material;
wherein the cathode active material comprises one or more of: nickel cobalt aluminum oxide (NCA), nickel cobalt manganese oxide (NCM), lithium cobalt oxide (LCO), lithium manganese oxide (LMO), Ni-rich layered oxides, Li-rich layered oxides, and spinel oxides $LiNi_{0.5}Mn_{1.5}O_4$; and
wherein the anode comprises an active material that comprises between 50% to 95% silicon by weight.

\* \* \* \* \*